Nov. 25, 1930.       M. LEUPOLD       1,783,091
RESILIENT TIRE
Filed May 25, 1929
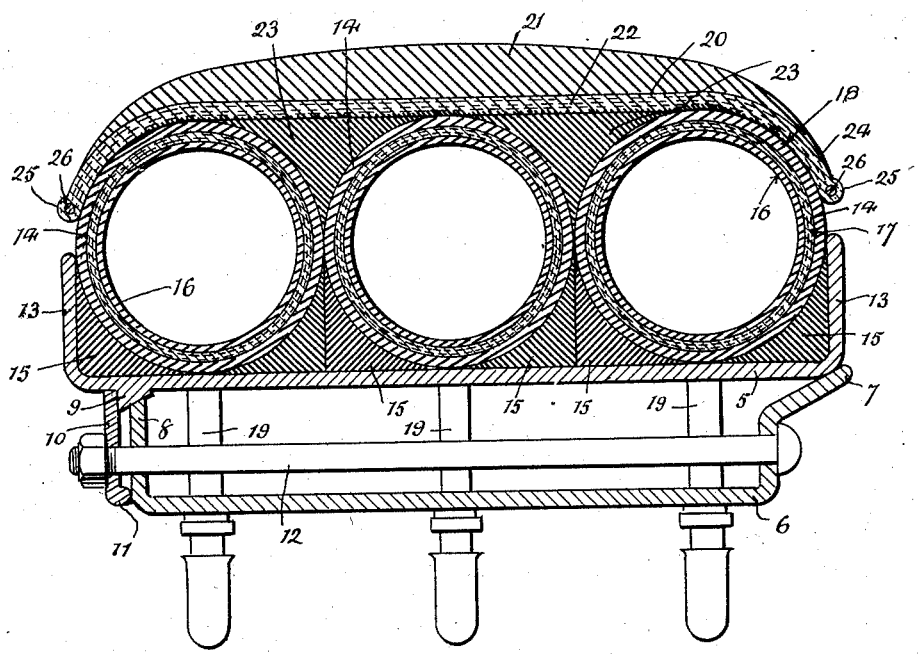
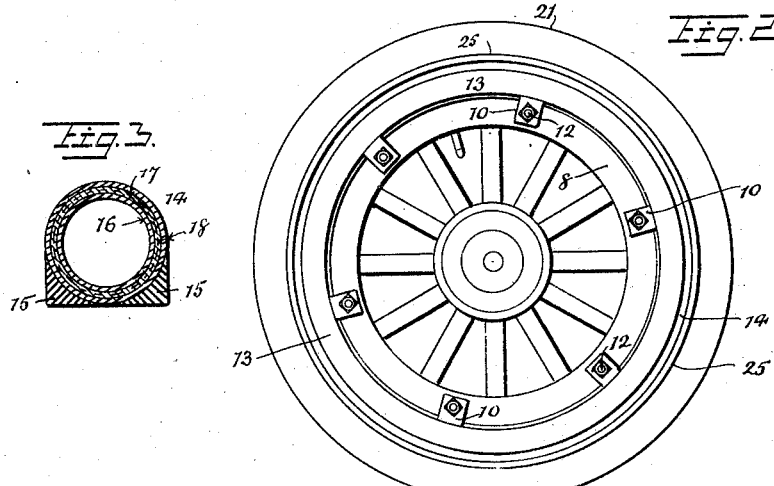
WITNESSES
H. T. Walker
E. B. Marshall
INVENTOR
MATHIAS LEUPOLD
BY
ATTORNEYS Patented Nov. 25, 1930

1,783,091

UNITED STATES PATENT OFFICE

MATHIAS LEUPOLD, OF JAMAICA, NEW YORK

RESILIENT TIRE

Application filed May 25, 1929. Serial No. 365,906.

My invention has for its object to provide a resilient tire having a tread which is held yieldingly in position by a plurality of inflated tubes, it being possible to remove the tread to replace the tubes when desired.

Another object of the invention is to provide a resilient tire with a plurality of inner inflated tubes, each tube having an inner cushion, the inner portions of the cushions being rectangular in cross section to permit the cushions to abut against the sides of a rim and against adjacent cushions to hold each tube in position on the rim.

Another object of the invention is to provide a resilient tire with a tread having an inner cushion with sides converging inwardly in cross section to fit between the outer portions of adjacent inflated tubes, which holds the tread yieldingly in position on the inflated tubes.

Still another object of the invention is to provide a resilient tire made up of elements which may be quickly assembled and which serve to hold a plurality of tubes in position without danger of chafing, and which also serve to hold a tread yieldingly extended at all points.

Additional objects of the invention will appear in the following specification, in which the preferred form is described.

In the drawings similar reference characters refer to similar parts in all the views, in which Figure 1 is a cross section showing my resilient tire and the means by which it may be mounted on a wheel;

Figure 2 is a side elevation showing a wheel with my resilient tire mounted thereon, the view being on a smaller scale than that shown in Figure 1;

Figure 3 is a cross section showing one of the resilient tubes with its rectangular cushions; and Figure 4 is a sectional view showing a configuration of the outer surface of a tread which may be used with my resilient tire.

My resilient tire is especially useful on trucks and busses but it will be understood that it may be used on all types of vehicles. Although a resilient tire with three tubes is shown in the drawings, a resilient tire with two, four or more tubes may be employed. Inasmuch as my resilient tire will be provided with a plurality of tubes, it will be seen that if one, and, in many cases, if two tubes are punctured the bus, truck or other vehicle may continue on schedule without stopping for repairs. Furthermore, it will be understood that the cushions on the tubes will hold the tubes in position, not only when all the tubes are inflated, but also should one or more of the tubes be punctured. The cushions at the inner side of the tread will prevent lateral movement of the tread relatively to the tubes and will also serve to hold the tread extended at all points and not only at the places where the inner tubes engage the tread. The resilient tire may be manufactured at little expense and may be dismounted quickly to replace parts, and in addition it will be seen that the tread of my wheel will give a greater and better grip on the road than the double wheel equipment which is now in general use.

By referring to the drawings it will be seen that the rim 5, which is preferably of the collapsible type, is secured to the felly 6 of the wheel. The said rim 5 may be secured to the felly 6 in any desired manner, one type of fastening being shown in Figures 1 and 2 of the drawings, but it will be understood that any other approved method may be used to secure the rim 5 to the felly 6 and to the wheel. As shown in the drawings, the felly 6 has a flange 7 for engaging at one side of the rim 5, and a flange 8 for engaging one side of a flange 9 at the other side of the rim 5. Cleats 10 engage the other, or outer, side of the flange 9, these cleats having projections 11 which engage the flange 8 and hold the cleats 10 in position relatively to the flange 8. The parts are held together by bolts 12, as shown in Figure 1 of the drawings.

The rim 5 has outwardly extending sides 13, and disposed between the sides 13 of the rim 5, there are a plurality of tubes 14, each tube having cushions 15 which are integral with the tubes 14, the cushions 15 also being triangular in shape in cross section, as shown in Figures 1 and 3 of the drawings. These cushions 15 fill the space between the sides 13 of the rim 5 and serve to hold the tubes 14 in position relatively to the rim 5, which will therefore prevent unnecessary chafing. The tubes 14 are preferably manufactured with a heavy rubber inner tube 16, a fabric jacket 17 enclosing the heavy inner tube 16, this fabric jacket 17 having a limited elasticity to permit some stretch when the tube 14 is inflated, and enclosing the fabric jacket 17 there is a rubber cover 18 to preserve the fabric jacket against unnecessary deterioration. The tubes 14 are inflated by the usual means, shown in Figures 1 and 2 of the drawings at 19.

Disposed around the tubes 14 there is a tread 20 which is preferably constructed with a rubber surface 21 and a fabric base 22, but it will be understood that this tread may be manufactured in any approved manner. Integral with this tread 20 there are inwardly disposed cushions 23 which are preferably V-shaped in cross section and which engage the tubes 14 so that the pressure from the tubes 14 will serve, not only to hold the tread 20 extended at the points where the tubes engage the said tread, but also at all other points so that the tread will be held yieldingly extended from one of its sides to the other. The cushions 23, as well as the cushions 15, will also serve to exert an even resistance to the pressure of the tubes 14 at substantially all points.

As will be seen by referring to Figure 1 of the drawings, the sides 24 of the tread 20 are disposed inwardly and terminate in beaded portions 25 which are preferably provided with metal cores 26 to serve as reinforcing members and to hold the sides 24 of the tread 20 in position.

When assembling the parts of my resilient tire, the tubes 14 are inserted within the tread 20, the tubes 14 being separated by the cushions 23, after which the collapsed rim 5 is disposed in position relatively to the tubes 14 with the sides 13 of the rim 5 abutting against the outer cushions 15. The rim, which has been collapsed up to this point, is then extended into normal position and the tubes 14 are inflated to press the tubes and the cushions 15 against the rim 5 and the tubes and the cushions 23 against the tread 20.

A tread with one outer surface is shown in Figure 1 of the drawings, which will serve the ordinary uses, but where it is desired to obtain a better grip on a sandy or unimproved road the tread may have a concave face or outer surface 27, as shown in Figure 4 of the drawings.

What I claim is:

1. In a resilient tire, a rim having outwardly extending sides, a plurality of separate tubes, each tube having integral cushions at its sides, the cushions on each tube being free from the cushions on adjacent tubes and which are disposed in the space between the sides of the rim, a tread disposed around the tubes, the tread having beyond the outer tubes inwardly extending sides spaced at all times from the rim and V-shaped cushions integral with the tread and disposed inwardly to engage the outer adjacent sides of the tubes.

2. In a resilient tire, a rim having outwardly extending sides, a plurality of tubes, each tube having cushions at its sides which fill the space between the sides of the rim, a tread disposed around the tubes, cushions on the tread, the cushions being disposed between adjacent tubes for supporting the tubes, the sides of the tread beyond the outer tubes extending inwardly and being non-elastic to assist in supporting the tubes.

3. In a resilient tire, a rim having outwardly extending sides, a plurality of tubes, each tube having integral inner cushions which are disposed in the space between the sides of the rim, the inner cushions on one tube being free from the cushions on adjacent tubes, and a tread disposed around the tubes and having cushions free from the first mentioned cushions and which engage the sides of the tubes.

4. In a resilient tire, a rim having outwardly extending sides, a plurality of separate tubes, each tube having two cushions at its sides which are free from the cushions on adjacent tubes and which are disposed in the space between the sides of the rim, the cushions serving to support the tubes respectively, a tread disposed around the tubes, the tread having beyond the outer tubes inwardly extending sides, and V-shaped cushions extending inwardly from the tread for engaging the outer adjacent sides of the tubes.

5. In a resilient tire, a rim having outwardly extending sides, a plurality of separate tubes, each tube having two cushions, one at each side, the cushions on each tube being free from the cushions on adjacent tubes and which are disposed in the space between the sides of the rim, the cushions serving to support the tubes respectively, and a tread disposed around the tubes.

6. In a resilient tire, a rim having outwardly extending sides, a plurality of separate tubes normally disposed on the rim, each tube having integral cushions which are free from the cushions on the other tubes to make each tube with its cushions a complete unit, the cushions filling the space between the sides of the rim, and a tread disposed around the tubes and having integral cushions free from the first mentioned cushions and the tubes, the last mentioned cushions being normally disposed between the tubes, the tread and the cushions thereon being moved into operative position by the inflation of the tubes.

Signed at New York, in the county of New York, and State of New York, this twenty-second day of May, 1929.

MATHIAS LEUPOLD.